United States Patent [19]

Chameroy et al.

[11] Patent Number: 5,613,424
[45] Date of Patent: Mar. 25, 1997

[54] DEVICE FOR CONTROLLING THE CLOSING AND OPENING OF LOCKING JAWS FOR A PRESSURE VESSEL

[75] Inventors: Eric Chameroy, Veronnes; Michel Cartigny, Mirebeau, both of France

[73] Assignee: SEB S.A., Ecully, France

[21] Appl. No.: 499,249

[22] Filed: Jul. 6, 1995

[30] Foreign Application Priority Data

Jul. 6, 1994 [FR] France .................................. 94 08585

[51] Int. Cl.$^6$ ............................. A47J 27/08; A47J 27/09; B65D 45/00; B65D 45/34
[52] U.S. Cl. ............................. 99/337; 99/403; 220/316; 220/325
[58] Field of Search ........................... 99/330, 337, 338, 99/342, 340, 403, 410–417, 449; 220/316, 319, 325, 912, 203, 209; 126/369, 377, 378, 373, 374, 388, 389; 292/256

[56] References Cited

U.S. PATENT DOCUMENTS

| | | | |
|---|---|---|---|
| 5,293,813 | 3/1994 | Schultz | 99/337 |
| 5,297,473 | 3/1994 | Thelen et al. | 99/403 |
| 5,317,959 | 6/1994 | Beluzzi | 99/337 |
| 5,370,257 | 12/1994 | Chameroy et al. | 220/316 |
| 5,370,259 | 12/1994 | Cartigny | 220/203 |
| 5,427,014 | 6/1995 | von Der Becke et al. | 99/337 |

FOREIGN PATENT DOCUMENTS

| | | |
|---|---|---|
| 0139772 | 10/1983 | European Pat. Off. . |
| 0491324 | 12/1991 | European Pat. Off. . |
| 2513504 | 4/1983 | France . |
| 2531847 | 2/1984 | France . |
| 3232907 | 3/1984 | Germany . |
| 3327439 | 2/1985 | Germany . |
| WO9203080 | 3/1992 | WIPO . |

Primary Examiner—Timothy F. Simone
Attorney, Agent, or Firm—Loeb & Loeb LLP

[57] ABSTRACT

A device for controlling opening and closing of jaws mounted on a cover of a cooking vessel, the vessel having a central axis and the jaws being movable by drive arms over a radial path relative to the central axis between a locking position in which the cover is locked to a container of the vessel and an unlocking position in which the cover can be removed from the container, the device including a control element mounted on the cover for movement relative to the cover in a radial direction relative to the central axis, the element, during its movement relative to the cover, engaging the drive arms in a manner to control displacement of the drive arms over the radial path.

17 Claims, 3 Drawing Sheets

DEVICE FOR CONTROLLING THE CLOSING AND OPENING OF LOCKING JAWS FOR A PRESSURE VESSEL

BACKGROUND OF THE INVENTION

The present invention relates to the general field of locking/unlocking systems for a cover of a container which forms a cooking vessel, preferably of the pressure type, as well as to control devices for displacing the jaws which assure locking.

The present invention concerns more specifically a device for controlling the opening and closing of jaws which are mounted for radial movement on the cover via drive arms, the jaws being intended to assure the locking of the cover on a container to form a cooking vessel, preferably of the pressure type.

There is already known in the art, for example as disclosed in published International Application 92/03080, a pressure cooking vessel using a locking/unlocking device composed of jaws which are mounted for radial movement on the cover. The jaws, of which there are two, are diametrically opposite one another relative to the longitudinal axis of the vessel and are adapted such that when in their closing position they tightly grip the peripheral edge of the container in order to hermetically seal the vessel. Conversely, the jaws can occupy an unlocking position permitting opening of the vessel. Control of the displacement of the jaws is assured by a control means, which is a button mounted to move axially on the cover in a central position. The control means is provided with engagement surfaces which are specially shaped to act, during displacement of the control button, on inclined surfaces fixed to the jaws in order to displace them radially. Such a control system thus transforms, in a conventional manner, an axial movement into a radial displacement movement of the jaws between a closing position and an opening position.

It can be considered that such a device represents a positive contribution to systems for locking vessels in a closed position for pressure cooking, particularly because it does not require a relatively precise positioning between the cover and the container before the control means are operated. On the other hand, such a system has been found to require a series of pieces which are movable relative to one another, and in particular radially, to assure control of disengagement of the jaws. The arrangements proposed thus far imply combinations of movements, such as translations and rotations, provoking risks of significant jamming and leading to high fabrication costs and a less than optimum operating reliability.

It is equally in order to note that the control mechanism of the above-described device, as well as the relative displacements of the various parts, requires a relatively substantial physical effort on the part of the user.

Moreover, it has been found that the jaw displacement control device disclosed in the above-cited patent offers less than optimum operating safety and ergonomics. In effect, the use of a control button, for opening and closing the jaws, disposed in a central position on the cover and which is displaced axially by pushing down in order to effect either opening or closing of the jaws, constitutes an inconvenience from the ergonomic standpoint and can present safety risks. Thus, it appears that the utilization of the same direction of movement to perform the two opposed functions of opening and closing of the jaws does not permit the user to establish, in a natural and instinctive manner, a unique association between a manual action, such as pushing, and a result, such as opening or closing. In this case, the same movement corresponds to different and opposite results. The control button can also serve conveniently as an element for gripping the vessel and can tempt the user to transport the vessel while under pressure via that gripping element and can even, because of the difficulty of memorizing a correct movement, cause the user to inadvertently manipulate the button, with the resulting danger of causing the vessel to open while under pressure.

SUMMARY OF THE INVENTION

An object of the present invention is to overcome the various difficulties noted above and to provide a new device for controlling the opening and closing of the jaws with distinctly different actions for controlling the operations of closing and opening, and in which handling safety, particularly during movement of the vessel, is improved.

Another object of the invention is to improve the distinctions between the manual movements necessary to control locking and unlocking movements of the locking jaws.

A further object of the invention is to improve the general ergonomics of the control device.

The above and other objects are achieved, according to the present invention, by a device for controlling opening mounted on a cover of a cooking vessel, the vessel having a central axis and the jaws being movable by drive arms over a radial path relative to the central axis between a locking position in which the cover is locked to a container of the vessel and an unlocking position in which the cover can be removed from the container, the device comprising a control element mounted on the cover for movement relative to the cover in a radial direction relative to the central axis, the element, during its movement relative to the cover, engaging the drive arms in a manner to control displacement of the drive arms over the radial path.

Other characteristics and advantages of the invention will become more readily apparent from the description to be presented below in conjunction with the attached drawings which illustrate a nonlimiting example of the invention.

DESCRIPTION OF THE PREFERRED EMBODIMENTS

Figure 1:
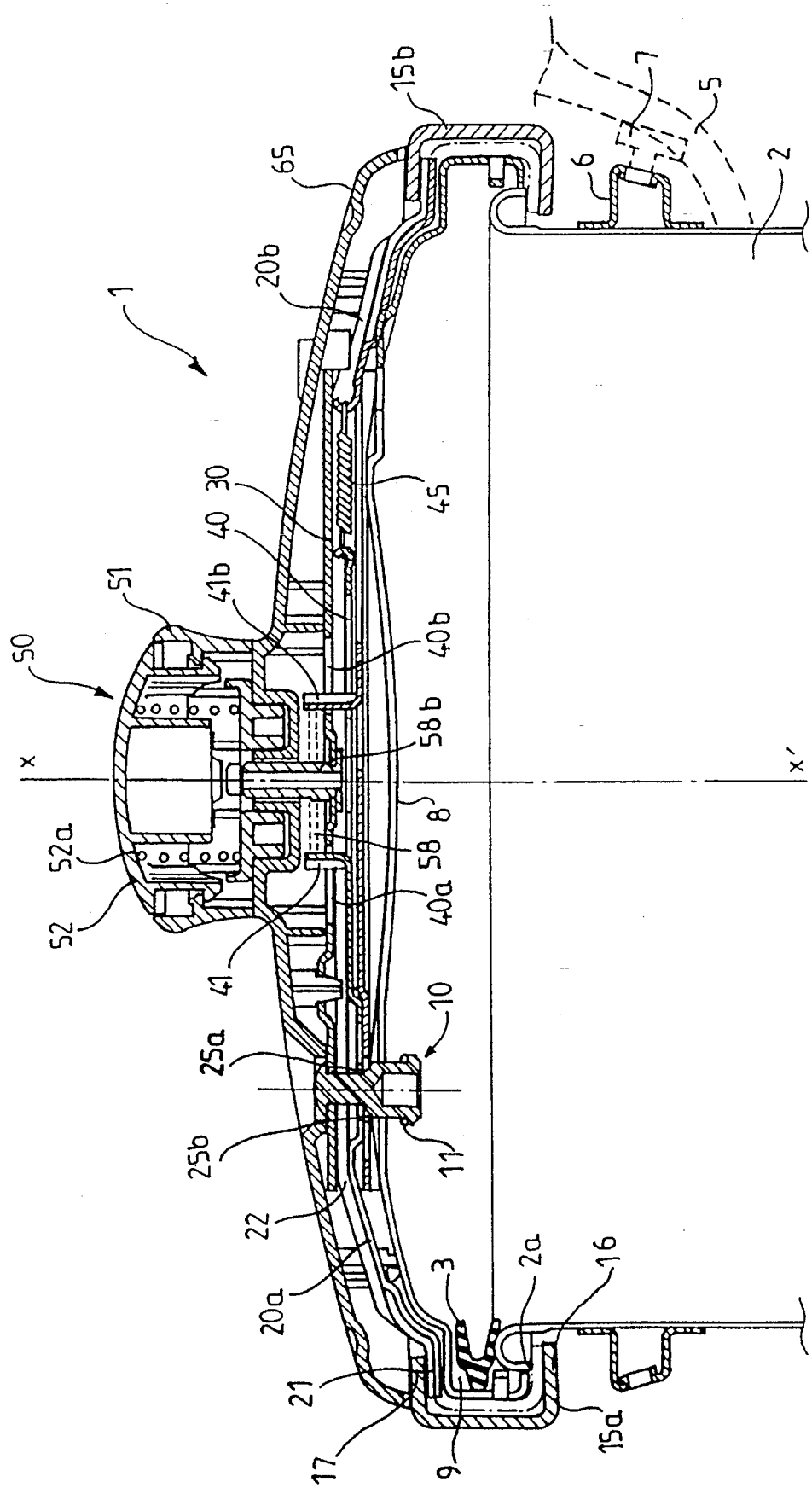
FIG. 1 is an elevational cross-sectional view of the upper portion of a cooking vessel provided with a control device according to a preferred embodiment of the invention.

The locking/unlocking device according to the invention is intended to assure closing, by locking, of a cover 1 on a container 2 in a manner to form a cooking vessel, preferably one for cooking under pressure such as a pressure cooker. Container 2 has, for example, substantially the form of a cylinder having a vertical central axis x–x'. Cover 1 is intended to be connected in a sealed manner to cover 1 through the intermediary of a lip-type seal 3.

Container 2 is, in a conventional manner, made of a metallic material such as stainless steel and is provided with a thermally conductive bottom that is fixed to container 2, for example by hot stamping. Container 2 also includes gripping elements such as handles 5 fixed to the walls of container 2 by the intermediary of attachment feet 6 and screws 7. Cover 1 includes a profiled closing disk 8 provided at its periphery with a zone in the form of a groove 9 arranged to receive lip-type seal 3, lip-type seal 3 and groove 9 providing a tight seal when container 2 is closed by cover 1.

Disk 8 is provided with at least one opening permitting the passage and mounting of a locking valve 10 mounted to move freely in a direction parallel to axis x–x' in the opening between a lower abutment position (shown in FIG. 1) and an upper abutment position.

Valve 10 can be of a type which is well known in the art, such as a valve having an indicating finger whose principal purpose is to provide a visual indication of the pressure level within the vessel. Advantageously, the fluid tightness between valve 10 and the opening is improved by the interposition of a sealing ring 11 which is maintained in position by resting on a flange 12 forming the lower radially exterior part of valve 10.

Figure 2:
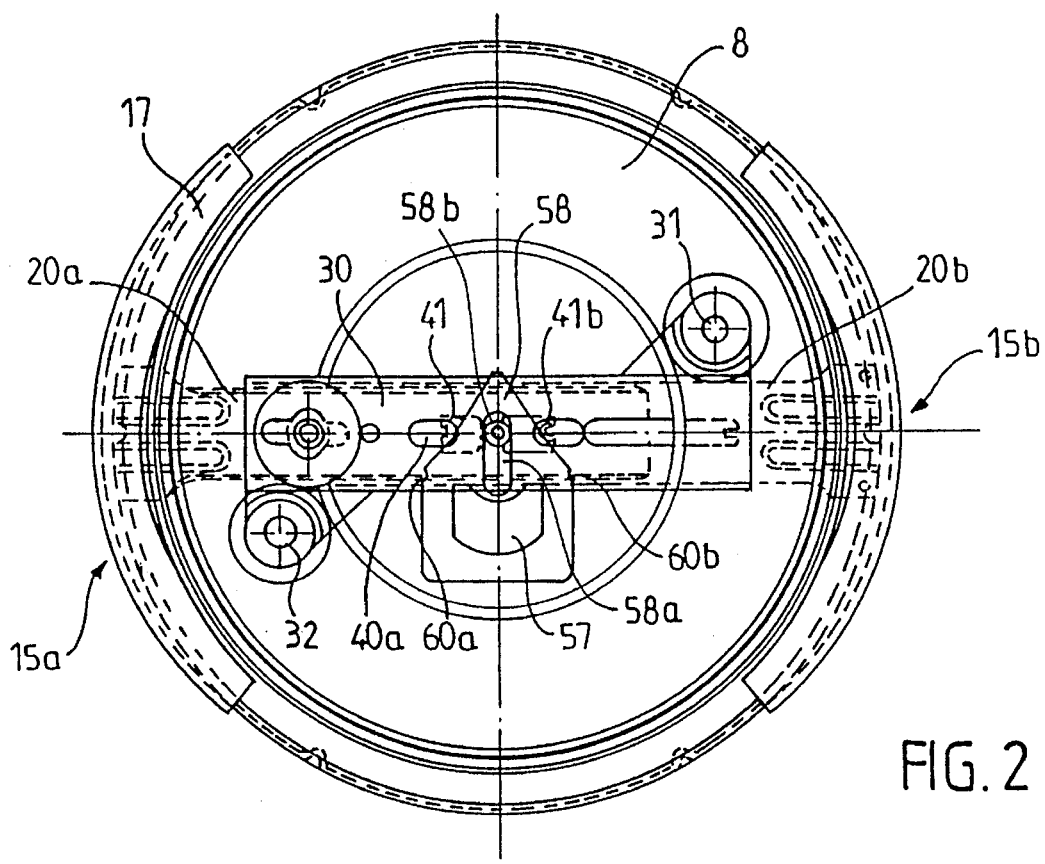
FIG. 2 is a top plan view showing the vessel of FIG. 1 with its jaws in the locking position.
Figure 3:
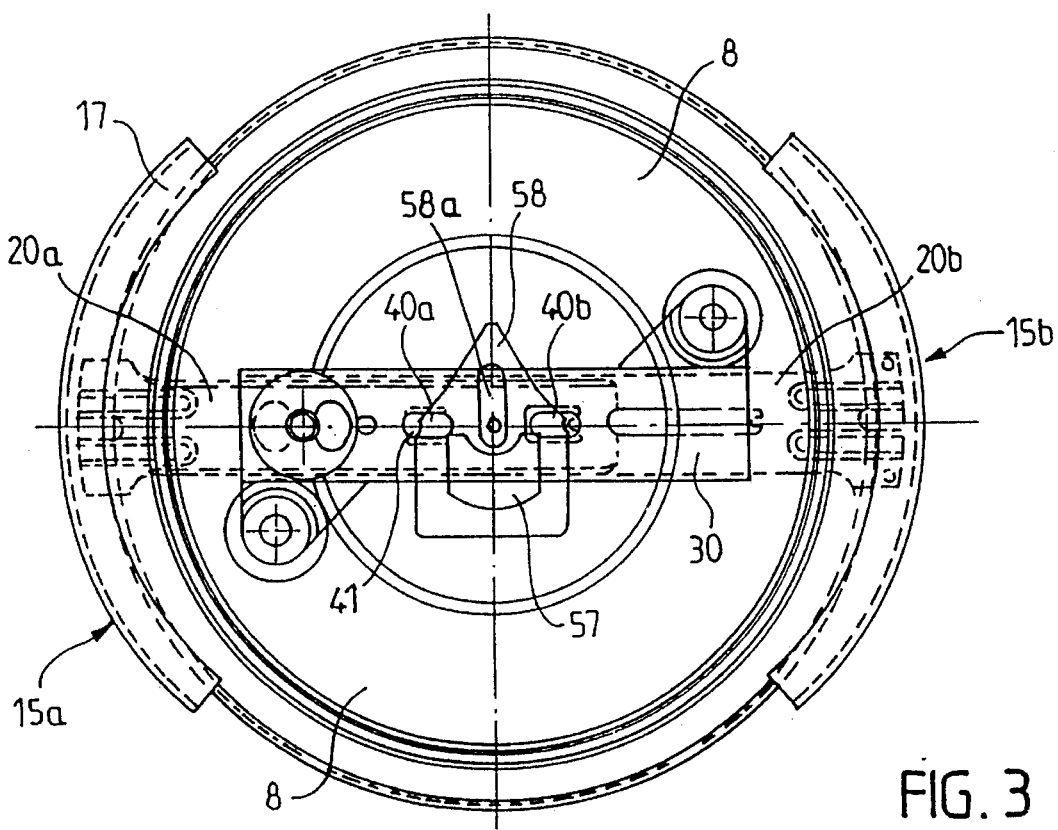
FIG. 3 is a view similar to that of FIG. 2 showing the jaws in their unlocking position.

Cover 1 also includes at least two jaws 15a, 15b mounted to be radially movable on disk 8 between a position for locking cover 1 on container 2 (FIGS. 1 and 2) and an unlocking position (FIG. 3). Jaws 15a, 15b have, in a conventional manner, a U-shaped cross section in the form of segments adapted to the shape of the vessel, in the embodiment illustrated in the drawings, these being in the form of circular arcs having a selected length.

Each jaw 15a, 15b includes a lower edge 16 and an upper edge 17, permitting each jaw to grip, respectively, a peripheral edge 2a of container 2 and the upper surface delimiting groove 9. Each jaw 15a, 15b is movably mounted on cover 1 and is movable under control of drive elements including associated drive arms 20a, 20b which are diametrically opposite one another. Each drive arm 20a, 20b has an extremity 21 which is secured, for example by soldering or welding, to the upper edge of an associated jaw 15a, 15b. In the preferred embodiment of the invention shown in FIGS. 1–4, each drive arm 20a, 20b has the form of a profiled metal piece, which may be generally straight or flat, having a shape adapted to that of disk 8 and a transverse cross section in the form of a U which opens toward the exterior of the vessel and whose sides 22 also extend toward the exterior of the vessel.

According to a preferred embodiment of the invention, each drive arm 20a, 20b has a length sufficient to allow the two arms to overlap, at least in part, during their radial displacement. According to this embodiment, arms 20a, 20b are guided radially by one another, arm 20a forming, for example, a male part and arm 20b then forming a female part, the male part sliding in the female part. Relative guiding of arms 20a, 20b is obtained by cooperation and friction of sides 22 of each of arms 20a, 20b. Such an arrangement obviously permits a reduction in the risks of possible deformation during radial sliding of each drive arm 20a, 20b, and allows a perfect mastery of linear displacement of each jaw 15a, 15b.

According to this preferred embodiment of the invention, each drive arm 20a, 20b is provided with a locking port 25a, 25b extending across the central part of each arm. The location of each locking port 25a, 25b is determined as a function of the length of each drive arm 20a, 20b such that each locking port 25a, 25b would be in an alignment position when each jaw 15a, 15b is in its locking position. Simultaneously, the position of ports 25a, 25b, as well as the position of the opening in disk 8 for valve 10, and thus also valve 10, is selected so that when each jaw 15a, 15b is in the locking position, each locking port 25a, 25b is aligned with the opening provided for valve 10. This arrangement permits valve 10 to be positioned in response to the pressure existing within the vessel, and in particular to be displaced to its upper abutment position in which valve 10 engages in each locking port 25a, 25b to lock jaws 15a, 15b in their locking position.

Such a position is only achieved when jaws 15a, 15b occupy their locking position precisely, because only then can valve 10 move through each locking port 25a, 25b. In the case where the alignment of each locking port 25a, 25b is not achieved at the end of a closing operation, valve 10 can not be displaced upwardly by pressure within the vessel, with the result that there will be a sufficient escape of steam around valve 10 to prevent any pressure rise within the vessel.

Advantageously, linear and radial movement of arms 20a, 20b along their intended paths is assured by supplemental guide means which are fixed to cover 1.

According to a preferred embodiment of the invention, the guide means are formed by a support piece 30 which embraces arms 20a, 20b along the major part of their length.

According to a preferred embodiment of the invention, support piece 30 is formed from a plate having a transverse cross section in the form of a U, embracing and covering arms 20a, 20b, the U being oriented to face disk 8. Plate 30 is advantageously fixed to disk 8 by the intermediary of anchoring points, such as shown at 31 and 32 in FIGS. 2 and 3, situated at opposite sides of the longitudinal axis of plate 30. Anchoring points 31, 32 can be constituted by suitable fixing means, such as screws, etc., or can also serve as the location for the passage of pressure regulation means.

By way of a modification, it is also possible to mount plate 30 in a reversed manner, the U-shaped cross section then opening toward the exterior, or top, of the vessel and the arms 20a, 20b sliding in one another as well as in plate 30. In this position, plate 30 embraces and supports arms 20a, 20b.

According to another variant of the invention, the guide means can be constituted by ramps or equivalent means, fixed to or integral with disk 8.

In all cases, and in particular in the case where a plate 30, presenting a U-shaped cross section, is utilized, the guide means assume, in addition to a function of supplementary aid to the linear sliding of the arms 20a, 20b, a complementary function of rigidifying the mechanical assembly, assuring radial displacement of jaws 15a, 15b.

The path of displacement of arms 20a, 20b, between each of their limit positions, corresponding to the opening and closing positions of jaws 15a, 15b, is limited by the intermediary of a slot 40 preferably arranged in male arm 20a. A lug 41 which is fixed to female arm 20b, extends into, and is displaceable along, slot 40. The path of displacement of arms 20a, 20b is thus limited by the establishment of abutment positions of lug 41 against one extremity or the other of slot 40.

According to a particular embodiment, plate 30 includes an opening aligned with each locking port 25a, 25b as well as with the opening in which valve 10 is mounted, its upper part having a reduced cross section with respect to the lower part of valve 10. Such an arrangement permits relative sliding of arms 20a, 20b when valve 10 is in its lower position, which simultaneously allows a free movement of jaws 15a, 15b.

Advantageously, arms 20a, 20b are normally brought to a locking position by an elastic return means constituted for example by a tension spring 45 interposed between two hooks which are each fixed to a respective one of arms 20a, 20b.

A locking/unlocking device according to the invention also includes a control means 50 for controlling the movement of jaws 15a, 15b, permitting each jaw 15a, 15b to be brought into one or the other of its fixed locking or unlocking positions.

Figure 4:
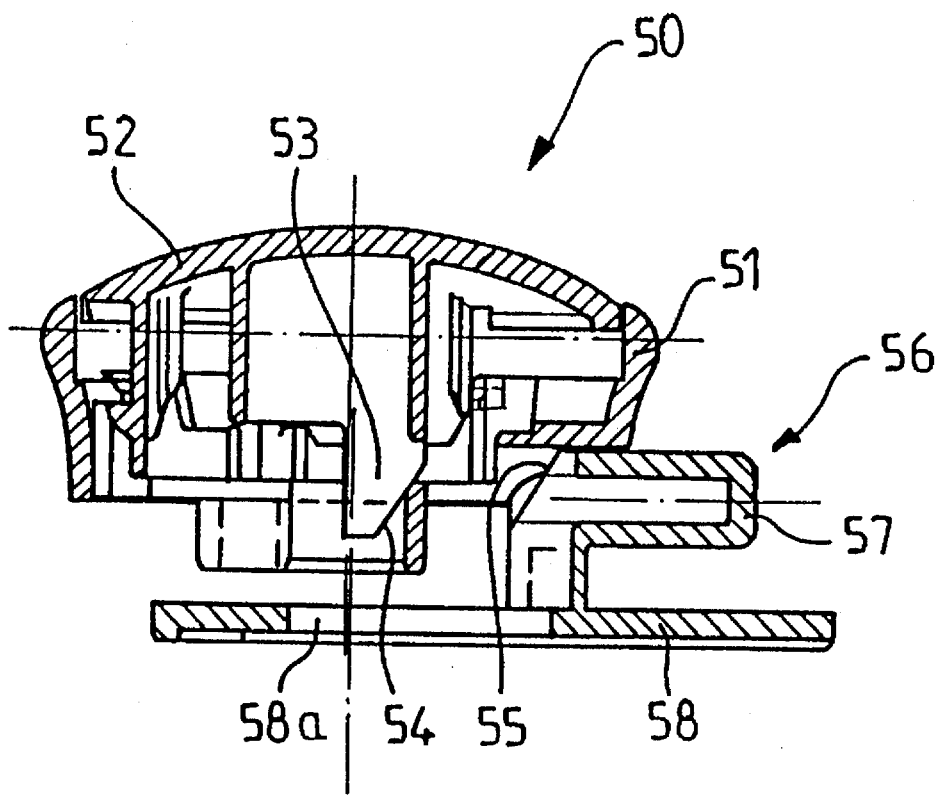
FIG. 4 is a cross-sectional detail view of the control device according to the illustrated embodiment of the invention. The plane of FIG. 4 is perpendicular to that of FIG. 1.

According to a preferred embodiment of the invention such as shown in FIG. 4, control means 50 has the form of an element for gripping, or a hand grip, for cover 1 and is constituted by a control element 56 mounted for movement in a substantially radial direction on cover 1. Control element 56 is coupled kinematically with a control button 52 which is mounted on cover 1 to be movable in a substantially axial direction, i.e. in a direction along axis x–x'.

Control means 50 is constituted by a knob 51 which is fixed to cover 1, and by control button 52 mounted to be axially movable against an elastic restoring force provided by a return spring 52a disposed within knob 51. Return spring 52a maintains control button 52 in the raised position shown in both FIGS. 1 and 4. The control button 52 includes at its lower part an activation finger 53 provided with an inclined engagement surface 54 intended to engage, during depression of control button 52, a complementary engagement surface 55 provided on control element 56. Control element 56 can be moved on cover 1 along a predetermined path in a manner to be brought, during its displacement between the two end positions of its path, to engage arms 20a, 20b in a manner to control the radial displacement of those arms.

According to a preferred embodiment of the invention, control element 56 assures radial outward displacement of arms 20a, 20b in an active manner, i.e. in the direction corresponding to the progressive spreading apart of jaws 15a, 15b, to attain their extreme unlocking position. According to this preferred embodiment of the invention, control element 56 is coupled kinematically with control button 52 and the displacement of control button 52 in an axial direction, as described previously, controls displacement of arms 20a, 20b in the radially inward direction, i.e. in the direction of displacement of the jaws to their locking position. For this purpose, control element 56 is formed by a button mounted on knob 51. Button 56 presents a control zone 57 which is in a raised position and is manually accessible to the user, as well as a flat activating triangular member 58 arranged to engage with activating means fixed to arms 20a, 20b. Triangular member 58 is shown in broken lines in FIG. 1 to avoid confusion with other components and is shown in solid lines in FIGS. 2–4.

According to preferred embodiment of the invention, the last-mentioned activating means are constituted by lug 41 and by a corresponding lug 41b which is fixed to arm 20b. Displacement of triangular member 58 in a radial direction, in either one of two mutually opposite senses, thus permits radial displacement of lugs 41, 41b, but in a direction which is perpendicular to the direction of displacement of control element 56. The ramps provided by triangular member 58 cause control element 56 to engage, in an active manner, arms 20a, 20b to progressively assure the spreading apart of lugs 41, 41b when the user presses against control zone 57.

When the guide means are formed by a support piece 30 covering arms 20a, 20b, then support piece 30 is provided with openings 40a, 40b arranged in the central part of support piece 30, and provided to permit passage of lugs 41, 41b, respectively, in order to permit their radial displacement. Openings 40a, 40b have for their secondary function to limit the individual displacement path of each arm 20a, 20b by serving as an abutment for lugs 41, 41b. This prevents any disengagement of jaws 15a, 15b outside of cover 1.

Advantageously, triangular zone member includes two recesses 60a, 60b, which are for example semicircular and which, in any case, have a form complementary of lugs 41, 41b in a manner to determine a stable and fixed opening position for jaws 15a, 15b, corresponding to a blockage of lugs 41, 41b in position in corresponding ones of recesses 60a, 60b.

Upon depression of control button 52 when jaws 15a, 15b are in their unlocking position, activation finger 53 comes to engage the complementary engaging surface 55 to control the release of control element 56. This release corresponds to movement of lugs 41, 41b out of recesses 60a, 60b, activation finger 53 thus forming release means while recesses 60a, 60b form blocking means. According to a preferred embodiment of the invention, as shown in FIGS. 1–4, control element 56 and control button 52 are mounted on cover 1 to form a lifting assembly for cover 1.

According to a modified form of construction of the invention, it is possible to separate the lifting assembly for cover 1 from control element 56 and control button 52.

By way of a complementary modification, it should also be obviously possible, without departing from the framework of the invention, to provide a control device including a single control element 56 capable of assuring, by itself, control movement in the two senses of the radial displacement movement of arms 20a, 20b. According to this modification, control element 56 assures the displacement of arms 20a, 20b in an active manner in the radially external direction and in the radially internal direction defined above. Control element 56 is then constituted by a simple push button whose shape permits the user, by a simple pushing or pulling maneuver, to assure the spreading or moving together of jaws 15a, 15b.

Cover 1 can include a trim plate 65 covering the totality of the mechanism, plate 65 being placed in a sandwich between support piece 30 and knob 51.

Triangular member 58 is provided with an elongated hole, or slot, 58a. A screw or pin 58b extends through slot 58a and serves to fix and block control means 50 to cover 1, and particularly to support piece 30. Slot 58a is dimensioned to allow triangular member 58 to be displaced relative to screw or pin 58b.

The functioning of the locking/unlocking device according to the invention will now be described.

Placement of cover 1 on container 2 requires opening of jaws 15a, 15b and radial activation of control element 56. This permits a sliding movement of triangular member 58 whose flanks come to progressively engage lugs 41, 41b (FIG. 2). The progressive displacement of control element 56 permits arms 20a, 20b and simultaneously jaws 15a, 15b, to progressively move apart. The translational movement of control element 56 in a radial direction thus permits a translation movement of jaws 15a, 15b also in a radial direction, but in a radial direction perpendicular to the radial direction of displacement of control element 56. The end of the translational movement is determined by the positioning of each lug 41, 41b in the associated recesses 60a, 60b (FIG. 3). Beyond this translation, the limit position of jaws 15a, 15b is equally determined by the abutment position of lug 41 against an end of slot 40. In the position thus achieved, jaws 15a, 15b are in a stable unlocking position and thus permit a centering of cover 1 on the edge of container 2.

Closing of the vessel, that is the attainment by jaws 15a, 15b of their locking positions, is obtained by pressure of the palm of the hand on control button 52 which is, as a result, depressed axially. Its downward movement into knob 51 provokes engagement of engagement surface 54 against its complementary engagement surface 55 provided on control element 56, which is then progressively pushed back in a radial outward direction. During the course of this translational movement in an inverse direction, lugs 41, 41b are first of all freed from recesses 60, 60b, while jaws 15a, 15b are then progressively pulled toward one another and toward their locking position (FIGS. 2 and 4). The return toward this locking position is obtained by the return action of tension spring 45 permitting the positioning of each jaw 15a, 15b around the edge of cover 1 and under the edge 2a of container 2.

The vessel being thus closed in a hermetically sealed and pressure tight manner, pressure can thereafter increase and provoke the movement of valve 10 into its raised position through ports 25a, 25b which are coaxial with one another when jaws 15a, 15b are in their completely closed position. The engagement of valve 10 through ports 25a, 25b permits locking of each drive arm 20a, 20b, and simultaneously each jaw 15a, 15b, in the locking position.

The locking/unlocking device according to the invention thus permits to assure the creation of pressure within the vessel with complete safety since passage of valve 10 through ports 25a, 25b can only occur if arms 20a, 20b, and thus jaws 15a, 15b, are in perfect locking positions. The valve 10 opposes, moreover, any radial displacement of jaws 15a, 15b. The radial and linear displacement of arms 20a, 20b is, moreover, obtained without risk of deformation due to a succession of guide means formed by the sliding of the arms in one another and by plate 30. As an example of a complementary variation, it is obviously possible to construct drive arms 20a, 20b so that they are not mounted one relative to the other in an overlapping arrangement, locking being obtained with the aid of a respective valve 10 associated with each locking port 25a, 25b.

The dissociation of the hand movement, or manipulation, necessary for locking of jaws 15a, 15b (axial pushing action or radial pulling) from that necessary for unlocking (radial pushing action) avoids manipulation errors, due to the fact that these manipulations will naturally be memorized and associated with the respective results.

This application relates to subject matter disclosed in French Application number FR-9408585, filed on Jul. 6, 1994, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A device for controlling opening and closing of jaws mounted on a cover of a cooking vessel, the vessel having a central axis and the jaws being movable by drive arms over a radial path relative to the central axis between a locking position in which the cover is locked to a container of the vessel and an unlocking position in which the cover can be removed from the container, said device comprising a control element mounted for movement in a substantially radial direction on said cover, said element, during its movement relative to said cover, engaging said drive arms in a manner to control displacement of said drive arms over the radial path.

2. A device according to claim 1 wherein said control element is a manually operable push button.

3. A device as defined in claim 1 wherein said control element is operative to cause displacement of said drive arms in an active manner in a radially outward direction and in a radially inward direction.

4. A device according to claim 3 wherein said control element is a manually operable push button.

5. A device as defined in claim 1 wherein said control element is operative to assure displacement of said arms in an active manner in a radially outward direction, said control means being coupled kinematically with a control button which is mounted on said cover for movement in a direction substantially along the central axis in order to control displacement of said arms in the radially inward direction.

6. A device according to claim 5 wherein said control element is a manually operable push button.

7. A device as defined in claim 5 wherein said control element comprises means for blocking said drive arms in the unlocking position, and said control button comprises a release means for controlling release of said blocking means.

8. A device according to claim 7 wherein said control element is a manually operable push button.

9. A device as defined in claim 8 wherein said control element further comprises a triangular member which is fixed to said push button and which is disposed to actively engage said drive arms in order to move said drive arms toward the unlocking position.

10. A device as defined in claim 9 wherein each of said drive arms is provided with a lug and said blocking means are constituted by recesses to cooperate with said lugs.

11. A device as defined in claim 7 wherein said control button is movable along the central axis in an active manner by a manual depression movement.

12. A device as defined in claim 11 wherein said release means comprise an activating finger arranged to engage said control element during depression of said control button in the direction of the central axis.

13. A device as defined in claim 12 wherein said control element and said control button are mounted on said cover at a central location of said cover to form a lifting handle for said cover.

14. A device as defined in claim 7 wherein said release means comprise an activating finger arranged to engage said control element during depression of said control button in the direction of the central axis.

15. A device as defined in claim 14 wherein said control element and said control button are mounted on said cover at a central location of said cover to form a lifting handle for said cover.

16. A device as defined in claim 5 wherein said control button is movable along the central axis in an active manner by a manual depression movement.

17. A device as defined in claim 10 wherein said recesses are formed in said triangular member.

* * * * *